Feb. 9, 1943.                H. BREMER ET AL                2,310,612
                    MOUNT FOR LONG WAVE QUARTZ CRYSTALS
                           Filed Dec. 6, 1940

INVENTORS
Heinrich Bremer
Friedrich Krones
BY
H. S. Srover
ATTORNEY

Patented Feb. 9, 1943

2,310,612

UNITED STATES PATENT OFFICE 2,310,612

MOUNT FOR LONG WAVE QUARTZ CRYSTALS

Heinrich Bremer and Friedrich Krones, Berlin, Germany; vested in the Alien Property Custodian Application December 6, 1940, Serial No. 368,804
In Germany October 13, 1939

7 Claims. (Cl. 171—327)

The mounting of quartz plates for long waves which carry out transversal oscillations, involves considerable difficulties because no nodal lines, or nodal points exist which are suited for the mounting. This is the case especially when employing plates which are excited to perform transversal oscillations. In the case of round plates, the center point can be considered as nodal point. Furthermore, nodal points appear at the border in the direction of the electrical and optical axis, or of the projection thereof into the plane of the plate but also these nodal points do not admit of an unobjectionable mounting.

The hitherto employed mounting methods are substantially such that the plates are loosely arranged in the mounts and are limited at the places where the oscillations disappear.

Furthermore, it is known to metallize the surfaces of quartz plates in order that they can serve as electrodes. However, it was found that just in the case of transversal cross oscillations, the oscillation performance is not subjected to an additional damping by this metallizing. On the other hand, in the case of such plates, the electrodes are strictly defined so that the frequency becomes practically independent of electrode variations. Moreover, it is also known to be possible to fasten quartz plates to several wires which are soldered onto the metallized surface. In order to suspend the plate on these wires a corresponding mounting system is then required. The drawback of this mode of fastening resides in that it is not possible rigidly to suspend the plates from such wires such as to prevent the plate and its supporting system from performing mechanical oscillations in the presence of vibrations. Furthermore, the adjustment of such mounting systems which comprise spanned wires involves difficulties.

Furthermore, in such systems, it is found to be disadvantageous that at temperature variations, tensions are introduced in this system so that the mechanical strength of the suspension means depends to a greater or lesser degree upon the temperature. Moreover, it was found that asymmetrical tensioning, such as is unavoidable when fastening the plate at several points, increases the damping of the plate and also changes the temperature coefficient.

In accordance with the present invention, the mounting of such plates is done in the simplest manner in that the plates covered with metal, are fixedly soldered at a single nodal place onto a stem. In this way, all the aforesaid drawbacks are overcome.

A form of execution of the invention is shown by way of example in the accompanying drawing.

Figure 1:
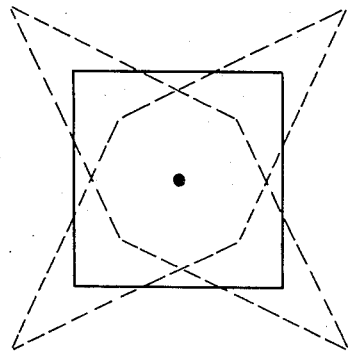
Fig. 1 shows the oscillation shape of a plate which carries out shear-type oscillations. The oscillation performance consists of periodic angle variations of the plate.
Figure 2:
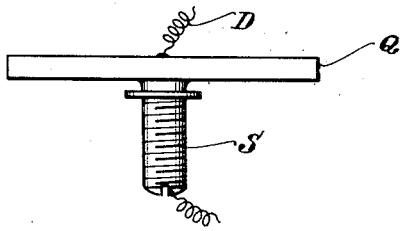
Fig. 2 represents the new mounting mode.
Figure 3:
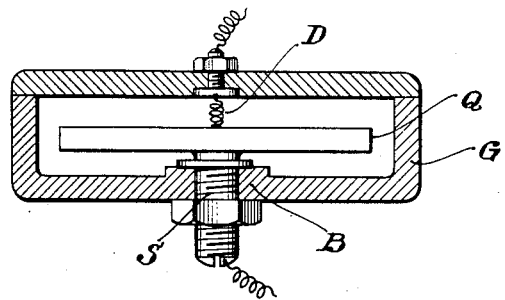
Fig. 3 shows again this mount together with the socket therefor.

According to the Figs. 2 and 3, the quartz plate Q is soldered to the metal stem S which rests upon a boss portion and is fixedly secured in a bushing B. The latter is supported by the casing. The stem S serves at the same time as electrode lead-in. The second electrode lead-in can be provided by soldering a wire D to the free electrode, or by connecting a spring strap.

Figure 4:
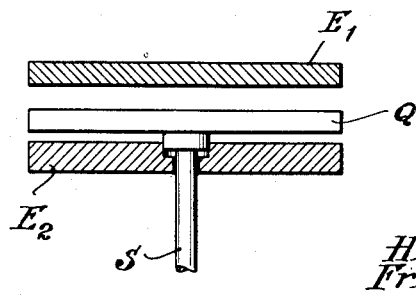
Fig. 4 shows a modified form of the invention

A particular advantage resides in the convenient gauging of the plate since in case of round plates, it is necessary to carry out a subsequent grinding of the plate diameter. Since the mounting stem of the plate forms a complete unit, the plate can be subsequently worked in any desired manner. This type of construction can be applied in all types of transversely oscillating plates, which carry out shear oscillations and also longitudinal oscillations, since also especially in case of longitudinally oscillating plates, nodal points and nodal lines appear. A particular advantage of this new arrangement is the great simplification of the structure of the quartz mount. In many cases, it is suitable to excite the quartz plate capacitively so as to be able to carry out an accurate tuning to the frequency across a variable capacity. This is done in a manner known as such by exciting with electrodes arranged parallel to the quartz plate. By varying the distance, the frequency can, as is known, be varied within certain limits. The mounting by means of rigid soldering of the plate to a stem in accordance with the present invention can be carried out also in this case whereby, as seen from Fig. 4, the plate is metallized only as far as is necessary for the direct soldering of the stem, while the electrodes $E_1$ and $E_2$ are arranged mechanically on both sides of the quartz plate Q. The advantage of this sort of fastening is that the plate is rigidly fastened to its base, i. e., to the stem, whereby deformation due to tensions can no longer occur.

In order to practice the invention it is necessary that the metal layers adhere favorably to the surface of the quartz crystal. Tests have shown that the adhesiveness of the layer complies with all demands. The described mounting can also be carried out in the case of plates which are excited to carry out oscillations in the thickness. In such plates, it is true that an additional damping occurs when the plate is mounted in the center thereof. If the mounting mandrel is sufficiently small in comparison to the diameter of the plate, a useful mode of mounting for thickness oscillations is likewise realized. As is known at suitable orientation of the plate in respect to the natural axes, natural oscillations of the plates can be excited in the case of shearing oscillations which depend on the diameter, as well as in the case of transversal thickness oscillations, which natural oscillations have a very small, or neglectable temperature coefficient. The new mode of mounting can also be applied in such plates.

What is claimed is:

1. A mounting for a quartz crystal plate comprising a single metal surface on each surface of said plate, a threaded stud rigidly secured to at least one of said metal surfaces on said crystal plate and at the central portion thereof, said stud serving as a single mechanical support and electrical connection for said crystal.

2. A mounting for a quartz crystal plate comprising a single metal surface on each surface of said plate, a threaded stud rigidly secured at the nodal point to at least one of the metal surfaces on said crystal plate, said stud serving as a single mechanical support and electrical connection for said crystal.

3. A mounting for a quartz crystal plate comprising a single metal surface on each surface of said plate, a stud rigidly secured to at least one of said metal surfaces on said crystal plate and at the central portion thereof, said stud serving as a single mechanical support and electrical connection for said crystal, and a flexible wire secured to the other surface of said plate to serve as the other connection.

4. A mounting for a quartz crystal plate comprising a single metal surface on each surface of said plate, a stud rigidly secured to at least one of said metal surfaces on said crystal plate and at the central portion thereof, said stud serving as a single mechanical support and electrical connection for said crystal, and a spring secured to the other surface of said plate to serve as the other connection.

5. A mounting for a quartz crystal plate comprising a single metal surface on each surface of said plate, a stud having a shouldered portion rigidly secured to at least one of the metal surfaces on said crystal plate and at the central portion thereof, said stud serving as a single mechanical support and an electrical connection for said crystal whereby the shouldered portion of said stud rests upon a boss portion which forms part of a housing for said crystal.

6. A mounting for a quartz crystal plate comprising a single metal surface on each surface of said plate, a casing having a threaded boss, a threaded stud rigidly secured at the nodal point to at least one of the metal surfaces on said plate, said stud threaded in said casing boss and serving as a single mechanical support and electrical connection for said crystal.

7. The method of making a piezo-electric crystal plate including the steps of shaping the plate to the approximate desired dimension, coating a portion of each surface of said crystal plate with metal, securing a rigid member to said metal coating, supporting said plate by means of said rigid member, and grinding said plate to the desired finished dimension.

HEINRICH BREMER.
FRIEDRICH KRONES.